United States Patent [11] 3,604,767

[72] Inventor Jacob Decker
 Cincinnati, Ohio
[21] Appl. No. 863,996
[22] Filed Oct. 6, 1969
[45] Patented Sept. 14, 1971
[73] Assignee Cincinnati Milacron Inc.
 Cincinnati, Ohio

[54] ADJUSTABLE PIVOTED SHOE BEARING AND METHOD OF ADJUSTING
 24 Claims, 6 Drawing Figs.
[52] U.S. Cl. .................................................. 308/73, 308/122
[51] Int. Cl. ............................................ F16c 17/06, F16c 1/24
[50] Field of Search ........................................... 308/73, 121, 122

[56] References Cited
 UNITED STATES PATENTS
Re. 25,028  8/1961  Thompson ................... 308/73
2,072,814  3/1937  Haas ............................. 308/73
2,224,652  12/1940  Kingsbury .................... 308/73
3,023,055  2/1962  Thompson .................... 308/73
3,063,762  11/1962  Hirtz ............................ 308/73
3,202,464  8/1965  Chaboseau et al. ........... 308/73
3,223,463  12/1965  Porath .......................... 308/73

Primary Examiner—Martin P. Schwadron
Assistant Examiner—Frank Susko
Attorney—Frank C. Leach, Jr.

ABSTRACT: One of the pivoted bearing shoes of a shoe bearing for a rotating spindle is adjusted relative to the spindle in accordance with the oil pressure between the bearing shoes and the spindle. The adjustment of the one bearing shoe changes the clearance of the bearing shoes so that all of the bearing shoes will have the same clearance relative to the spindle in accordance with the desired speed of the spindle that corresponds to a specific oil pressure between the other bearing shoes and the spindle.

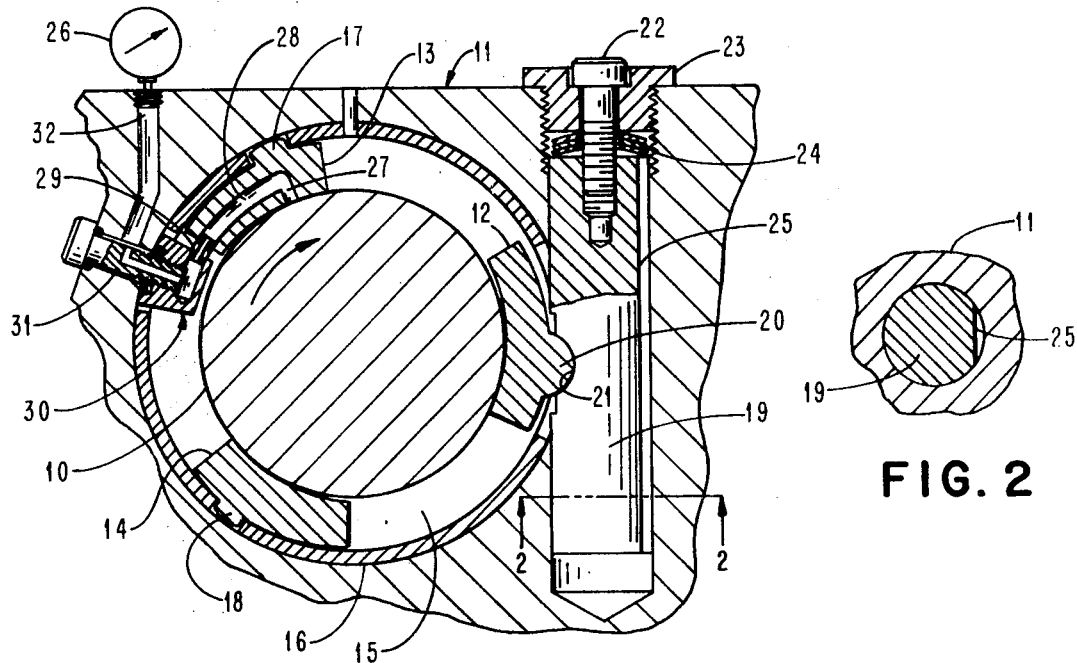
FIG. 1
FIG. 2
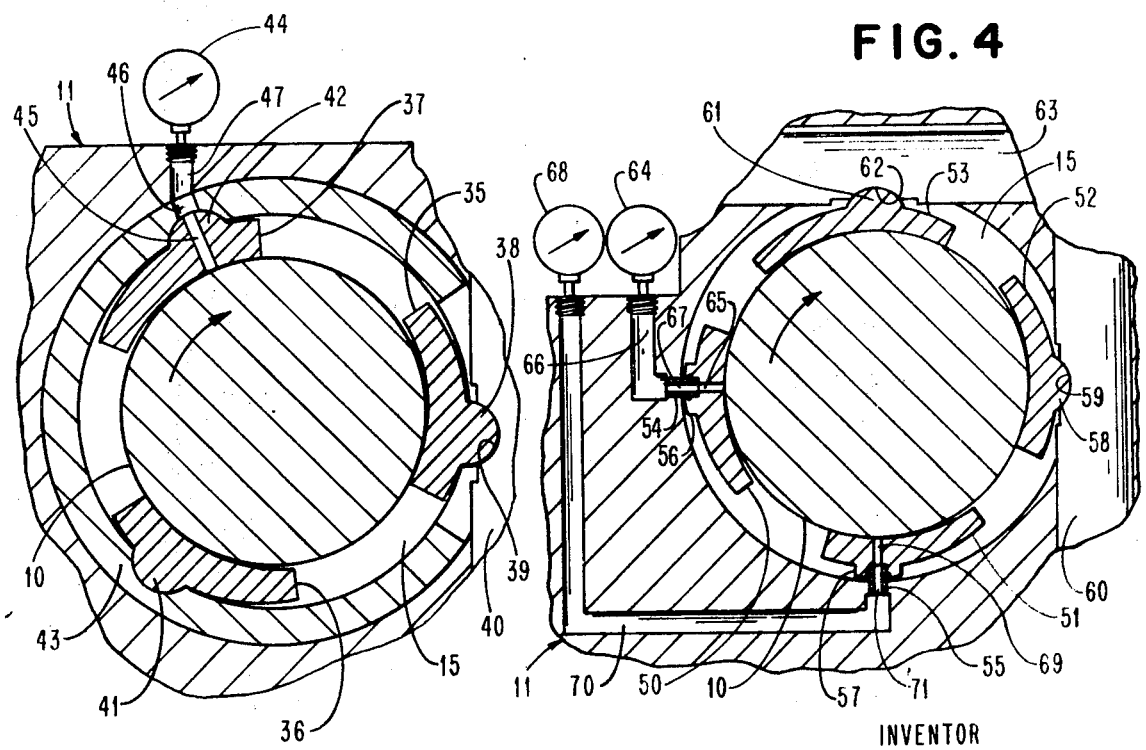
FIG. 3
FIG. 4
INVENTOR
JACOB DECKER
BY Frank C. Leach Jr.
ATTORNEY

ADJUSTABLE PIVOTED SHOE BEARING AND METHOD OF ADJUSTING

In grinding machines, the spindle may be supported by a plurality of bearing shoes with an oil film between each of the bearing shoes and the spindle. The space or clearance between the spindle and each of the bearing shoes can be selected for a specific speed of the spindle.

The clearance between the spindle and each of the bearing shoes has previously been adjusted by depending upon the experience of the assembler of the grinding machine. Therefore, there have been instances in the past in which the assembler has failed to provide the proper clearance between the spindle and each of the bearing shoes for the specific speed of the spindle.

If the bearing shoes are not properly positioned with respect to the spindle, the bearing shoes will not provide the desired maximum rigidity. Since a pivoted shoe bearing having maximum rigidity prevents chatter and controls some of the effect of the out of balance of the spindle due to the unbalance of the grinding wheel, the failure to provide the proper radial clearance of the bearing shoes with respect to the spindle so that they have maximum rigidity results in unusable parts.

The present invention satisfactorily solves the foregoing problem by providing a pivoted show bearing that has maximum rigidity at any speed of the rotating spindle. This is accomplished by adjusting the radial clearance of the bearing shoes in accordance with the desired speed of the spindle.

The present invention adjusts the radial clearance of a least one of the bearing shoes until a desired oil pressure, which is commensurate with a certain speed of the spindle, exists between the spindle and at least one of the other bearing shoes. When the desired oil pressure exists between the one other bearing shoe and the spindle, further adjustment of the one bearing shoe is stopped so that all of the bearing shoes are adjusted for proper clearance relative to the desired speed of the spindle.

As a result of adjusting the radial clearance until the desired oil pressure exists between the spindle and at least one of the other bearing shoes, there is no dependence upon the experience of the assembler for properly setting the bearing shoes with respect to the spindle. Therefore, the present invention permits an inexperienced assembler to properly position the bearing shoes with respect to the spindle to provide the desired maximum rigidity to the spindle by the bearing shoes.

In one embodiment of the invention, the adjustment of the radial clearance of at least one of the bearing shoes until the desired oil pressure exists between the spindle and at least one of the other bearing shoes is accomplished automatically. Thus, in the embodiment in which automatic adjustment of the bearing shoes is continuously obtained in the field, there is no requirement for any skill of the assembler in adjusting the bearing shoes for the desired speed of the spindle other than setting the desired speed of the spindle in the control circuitry that adjusts the bearing shoes in response to the oil pressure, which is commensurate with the speed of the spindle.

While the present invention has particular utility in assembly of the bearing shoes on a spindle of a grinding machine, for example, it should be understood that the present invention could be utilized to adjust the clearance between a spindle of a regulating wheel of a centerless grinder and the bearing shoes in accordance with the desired speed of the regulating wheel. Since the desired speed of the regulating wheel of a centerless grinder depends upon the size of the part being ground, any change in the size of the part being ground necessitates a change in the speed of the regulating wheel. Accordingly, the automatic adjusting mechanism of the present invention permits the operator of the centerless grinder to properly adjust the positions of the bearing shoes with respect to the spindle of the regulating wheel in accordance with the size of the parts to be ground since this will require a specific speed of the regulating wheel.

Thus, if it should be desired to decrease the speed of the spindle, the bearing shoes must be moved closer to the spindle whereas an increase in the speed of the spindle necessitates the bearing shoes to be moved further away from the spindle. The automatic adjusting mechanism for the present invention provides the desired clearance between the spindle and the bearing shoes in accordance with the desired speed of the spindle.

Since the adjustment of the pivoted bearing shoes can easily be made by the operator of the centerless grinder, the present invention permits utilization of pivoted bearing shoes for the regulating wheel so that the regulating wheel can operate at a plurality of different speeds without any possibility of damage to the parts being ground due to the regulating wheel spindle not rating at the desired speed. Thus, the present invention allows substantial changes to be made in the speed of a regulating wheel spindle while still obtaining rigid backing of the pivoted bearing shoes for the spindle.

An object of this invention is to provide adjustable bearing shoes for a spindle or the like.

Another object of this invention is to provide a shoe bearing for a spindle or the like in which the positions of the bearing shoes with respect to the spindle are adjusted in accordance with the desired speed of the spindle.

A further object of this invention is to provide a mechanism that adjusts the positions of the bearing shoes in accordance with the oil pressure between the bearing shoes and the spindle.

Still another object of this invention is to provide a method of adjusting the clearance between the bearing shoes and the spindle.

Other objects of this invention will be readily perceived from the following description, claims, and drawings.

This invention relates to an improvement in a bearing arrangement having a housing with a member rotatably mounted therein. A plurality of bearing shoes is carried by the housing and circumferentially spaced around the rotating member with means pivotally mounting each of the bearing shoes in the housing. Each of the bearing shoes creates an oil film between it and the rotating member during rotation of the rotating member. The improvement comprises means to adjustably change the position of the pivotal mounting means of at least one of the shoe bearings relative to the rotating member in accordance with a selected speed of the rotating member to change the clearance between each of the bearing shoes and the rotating member.

This invention also relates to an improvement in a bearing arrangement having a housing with a member rotatably mounted therein. A plurality of bearing shoes is carried by the housing and circumferentially spaced around the rotating member with means pivotally mounting each of the bearing shoes in the housing. Each of the bearing shoes creates an oil film between it and the rotating member during rotation of the rotating member. The improvement comprises means to ascertain the oil pressure between at least one of the bearing shoes and the rotating member and means to adjustably position at least one of the other of the bearing shoes relative to the rotating member in accordance with the ascertained oil pressure to change the clearance between each of the bearing shoes and the rotating member.

This invention further relates to a method of adjusting the clearance between each of a plurality of circumferentially spaced bearing shoes and a rotating member with an oil film between each of the bearing shoes and the rotating member during rotation of the rotating member. The method comprises ascertaining the oil pressure between at least one of the bearing shoes and the rotating member and then adjusting the position of at least one of the other of the bearing shoes relative to the rotating member to change the clearance between each of the bearing shoes and the rotating member until the ascertained oil pressure is at a selected value.

This invention still further relates to a method of adjusting the clearance between each of a plurality of circumferentially spaced pivotally mounted bearing shoes and a rotating member. The method includes changing the position of the pivotal mounting for at least one of the bearing shoes relative to the rotating member in accordance with a selected speed of the rotating member to change the clearance between each of the bearing shoes and the rotating member.

The attached drawings illustrate preferred embodiments of the invention, in which:

FIG. 1 is a sectional view of a bearing arrangement employing the adjusting mechanism of the present invention;

FIG. 2 is a sectional view of the adjusting bar and taken along line 2—2 of FIG. 1;

FIG. 3 is a sectional view of another form of bearing arrangement utilizing the adjusting mechanism of the present invention;

FIG. 4 is a sectional view of still another form of bearing arrangement employing the adjusting mechanism of the present invention;

Figure 5:
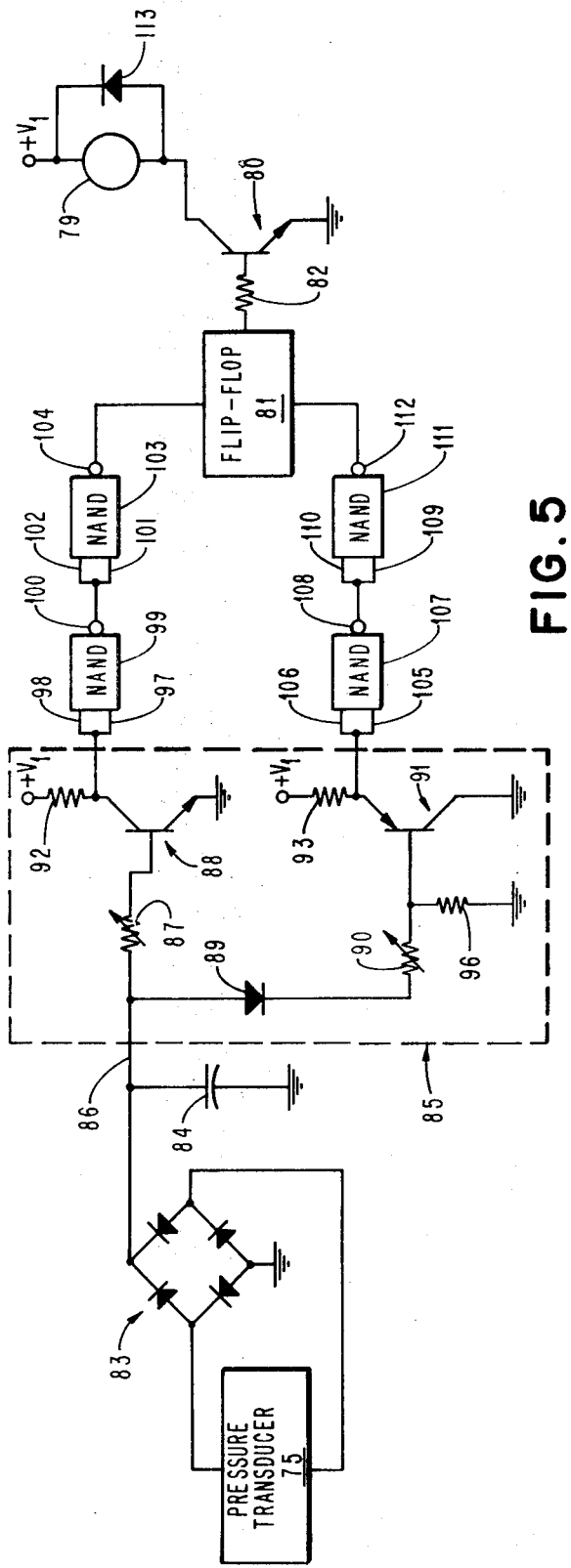
FIG. 5 is a schematic wiring diagram of a circuit for controlling the adjusting mechanism of the present invention.

Referring to the drawings and particularly FIG. 1, there is shown a rotating member such as spindle 10 rotatably mounted within a housing 11. A plurality of bearing shoes 12, 13, and 14 is mounted within a chamber 15, which is filled with oil, in the housing 11 with the bearing shoes being substantially equally circumferentially spaced from each other around the spindle 10.

The bearing shoes 13 and 14 are mounted within a retainer ring 16, which is disposed with its outer surface engaging the bore of the housing 11 defining the chamber 15. Each of the bearing shoes 13 and 14 has a projecting portion 17 and 18, respectively, disposed within an opening in the retainer ring 16.

Each of the projecting portions 17 and 18 has an outer surface with a radius of curvature less than the radius of curvature of the bore of the housing 11. This arrangement pivotally mounts each of the bearing shoes 13 and 14 for rocking about its projecting portion only in a radial direction. The bearing shoes 13 and 14 cannot rock longitudinally because of the cooperation between the retainer ring 16 and the projecting portion of each of the bearing shoes 13 and 14.

As previously mentioned, the chamber 15 of the housing 11 is filled with oil. As the spindle 10 rotates, the pressure of the oil increases as it enters between each of the bearing shoes 12–14 and the spindle 10 to form an oil film therebetween during rotation of the spindle 10 in the well-known manner.

The bearing shoe 12 is pivotally mounted in an adjusting bar 19 by having a projecting arcuate portion 20 of the bearing shoe 12 disposed in a cooperating arcuate seat 21 in the adjusting bar 19. The projecting arcuate portion 20 permits rocking of the bearing shoe 12 only in a radial direction.

The adjusting bar 19 is positioned by an adjusting screw 22, which has its lower end threaded in the upper end of the adjusting bar 19. The adjusting screw 22 is slidably disposed within an insert 23, which is threaded within the housing 11. Resilient means such as Belleville washers 24, for example, are disposed between the insert 23 and the adjusting bar 19 to continuously urge the adjusting bar 19 downwardly and to urge the head of the adjusting screw 22 against the upper surface of the insert 23.

It should be understood that the adjusting bar 19 is initially positioned so that the pivotal mounting portion 20 of the bearing shoe 12 is offset slightly from an equal angular relation to the pivotal mounting portions 17 and 18 of the bearing shoes 13 and 14, respectively, and closer to the portion 18. This allows for tolerances plus the adjustment of the bearing shoe 12 by the adjusting bar 19.

Accordingly, when the adjusting screw 22 is rotated in one direction, the adjusting bar 19 is moved downwardly by the force of the Belleville washers 24 so that the bearing shoe 12 rotates clockwise relative to the spindle 10 whereby the position of the pivotal mounting portion 20 of the bearing shoe 12 is changed by moving the pivotal mounting portion 20 of the bearing shoe 12 tangentially to a locus of rotation about the axis of the spindle 10. When the adjusting screw 22 is rotated in the opposite direction, it moves the adjusting bar 21 upwardly against the force of the Belleville washers 24 to rotate the bearing shoe 12 counterclockwise relative to the spindle 10 to change the position of the pivotal mounting portion 20 of the bearing shoe 12 by moving the pivotal mounting portion 20 of the bearing shoe 12 tangentially to a locus of rotation about the axis of the spindle 10.

When the bearing shoe 12 is rotated clockwise by downward movement of the adjusting bar 19, the clearance between each of the bearing shoes 12–14 and the spindle 10 is increased. When the bearing shoe 12 is rotated counterclockwise by upward movement of the adjusting bar 19, the clearance between each of the bearing shoes 12–14 and the spindle 10 is decreased.

As shown in FIG. 2, the adjusting bar 19 has its circular cross section formed with a flat surface 25 on the side opposite from the projecting portion 20 of the bearing shoe 12. This provides a more stable base of support for the adjusting bar 19 within its bore in the housing 11.

The oil pressure between the inner surface of the bearing shoe 13 and the spindle 10 is ascertained by a gage 26, which communicates with the area between the bearing shoe 13 and the spindle 10. The gage 26 communicates as close as possible with the point at which the peak oil pressure occurs between the bearing shoe 13 and the spindle 10.

The bearing shoe 13 has a passage 27 communicating with the area between the inner surface of the bearing shoe 13 and the spindle 10 and with a second passage 28 in the bearing shoe 13. The passage 28 is connected through a passage in a tubing 29 with a passage in a connector 30, which has a screw 31 threaded therein to mount the connector 30 within the chamber 15. The screw 31 has a passage connecting the passage in the connector 30 with the gage 26 by means of a passage 32 in the housing 11.

Accordingly, since the oil pressure between any of the bearing shoes 12–14 and the spindle 10 for any particular speed of the spindle 10 is known and is the same, it is only necessary to adjust the pivotal mounting position of the bearing shoe 12 by means of the adjusting screw 22 until the gage 26 indicates a pressure corresponding to the speed at which it is desired for the spindle 10 to rotate. Thus, since the changing of the position of the bearing shoe 12 not only changes its clearance with the spindle 10 but also the clearances between the spindle 10 and each of the bearing shoes 13 and 14 so that they are the same, the clearance between either of the bearing shoes 13 or 14 and the spindle 10 could be used to determine the oil pressure.

Therefore, as this clearance decreases, the pressure of the oil increases. Likewise, as the clearance increases, the pressure of the oil decreases. Thus, it is only necessary to move the adjusting bar 19 in the desired direction to change the position of the pivotal mounting portion 20 of the bearing shoe 12 to have the same desired clearance between each of the bearing shoes 12–14 and the spindle 10.

Referring to FIG. 3, there is shown another form of the present invention in which bearing shoes 35–37 are mounted in the housing 11 in substantially equally circumferentially spaced relation. The bearing shoe 35 has a spherical portion 38 mounted in a spherical seat 39 of an adjusting bar 40, which is similar to the adjusting bar 19 except for the seat 39 being spherical. This arrangement permits the shoe bearing 35 to rock both radially and longitudinally.

The bearing shoes 36 and 37 have spherical portions 41 and 42, respectively, for pivotally mounting the bearing shoes 36 and 37. The spherical portions 41 and 42 of the bearing shoes 36 and 37, respectively, are mounted in spherical-shaped shaped seats in a retaining ring 43. The retaining ring 43 is disposed within the bore of the housing 11 forming the oil-filled chamber 15.

The pressure of the oil between the spindle 10 and the bearing shoe 37 is ascertained by a gage 44, which is connected to the area between the bearing shoe 37 and the spindle 10. The gage 44 is connected as close as possible with the point at which the peak oil pressure occurs between the bearing shoe 37 and spindle 10.

The bearing shoe 37 has a passage 45 therein communicating with the area between the bearing shoe 37 and the spindle 10 and also with a passage 46 in the retaining ring 43. A passage 47 extends through the housing 11 from the passage 46 for connecting the passage 46 with the gage 44.

The change of the position of the bearing shoe 35 is accomplished by moving the adjusting bar 40 in the same manner as the adjusting bar 19 is moved. This changes the clearance between each of the bearing shoes 35–37 with respect to the spindle 10 until the pressure between the bearing shoe 37 and the spindle 10 is that for the desired speed of the spindle 10. When this occurs, the gage 44 indicates this desired pressure, and adjustment of the adjusting bar 40 ceases.

Referring to FIG. 4, there is shown another embodiment of the invention in which the spindle 10 is supported within the housing 11 by four substantially equally circumferentially spaced bearing shoes 50, 51, 52, and 53. The bearing shoes 50 and 51 are fixed to the housing 11 by mounting pins 54 and 55, respectively.

The bearing shoe 50 has a projecting portion 56 surrounding the pin 54 to pivotally mount the bearing shoe 50. The bearing shoe 51 has a projecting portion 57 surrounding the pin 55 to pivotally mount the bearing shoe 51.

Each of the projecting portions 56 and 57 has its outer surface formed with a radius of curvature less than the radius of curvature of the bore of the housing 11 defining the oil-filled chamber 15 in which the bearing shoes are disposed. As a result, the bearing shoes 50 and 51 can rock only in a radial direction and not longitudinally.

The bearing shoe 52 has a projecting arcuate portion 58 disposed within an arcuate seat 59 in an adjusting bar 60, which is similar to the adjusting bar 19. The adjusting bar 60 is moved by the same means as moves the adjusting bar 19. The projecting arcuate portion 58 and the arcuate seat 59 are curved to allow rocking of the bearing shoe 52 only in a radial direction.

The bearing shoe 53 has a projecting arcuate portion 61 disposed within an arcuate seat 62 in an adjusting bar 63. The adjusting bar 63 is similar to the adjusting bar 19 and is adjusted in the same manner. However, the adjusting bar 63 is mounted for movement in a horizontal direction. The projecting arcuate portion 61 and the arcuate seat 62 are curved so that the shoe bearing 53 can rock only in a radial direction.

The oil pressure between the bearing shoe 50 and the spindle 10 is ascertained by a gage 64, which communicates with the area between the bearing shoe 50 and the spindle 10. The gage 64 communicates as close as possible with the point at which the peak oil pressure occurs between the bearing shoe 50 and the spindle 10.

The bearing shoe 50 has a passage 65 communicating with the area between the bearing shoe 50 and the spindle 10 and with a passage 66 in the housing 11. The passage 65 communicates with the passage 66 through a passage 67 in the mounting pin 54, which is surrounded by an O-ring to prevent leakage between the outer surface of the pin 54 and the bearing shoe 50. The passage 66 communicates with the gage 64 whereby the gage 64 ascertains the oil pressure between the bearing shoe 50 and the spindle 10.

A gage 68 communicates with the space between the bearing shoe 51 and the spindle 10 to ascertain the oil pressure therein. The gage 68 communicates as close as possible with the point at which the peak oil pressure occurs between the bearing shoe 51 and the spindle 10.

The bearing shoe 51 has a passage 69 communicating with the space between the bearing shoe 51 and the spindle 10 and with a passage 70 in the housing 11. A passage 71 in the mounting pin 55, which is surrounded by an O-ring to prevent leakage between the outer surface of the pin 55 and the bearing shoe 51, connects the passages 69 and 70 to each other. The passage 70 communicates with the gage 68, which indicates the oil pressure between the bearing shoe 51 and the spindle 10.

In positioning the pivotal mounting means for the bearing shoes 52 and 53, each of the bearing shoes 52 and 53 is adjusted in accordance with the oil pressure between the diametrically disposed bearing shoe and the spindle 10. Accordingly, the bearing shoe 53 is preferably initially adjusted in accordance with the pressure indicated by the gage 68. Then, the bearing shoe 52 is adjusted in accordance with the pressure indicated by the gage 64.

Accordingly, each of the bearing shoes 52 and 53 has its position adjusted by changing the position of its pivotal mounting means by moving each of the pivotal mounting means tangentially to a locus of rotation about the axis of the spindle 10 until the gages 64 and 68, respectively indicate the desired pressure for the specific speed of the spindle 10.

While a different type of connection from the gages to each of the areas between the bearing shoes and the spindle 10 has been shown for each of the various modifications, it should be understood that any of the embodiments could utilize one of the other types of gage connection if desired.

Figure 6:
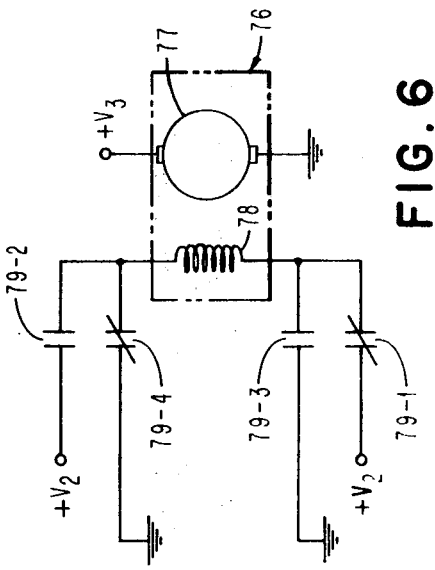
FIG. 6 is a schematic wiring diagram of the control of a motor by the circuit of FIG. 5 for moving the adjusting bar.

Referring to FIGS. 5 and 6, there is shown means for automatically controlling the adjustment of the pivoted bearing shoes. This automatic means insures that the bearing shoes remain properly disposed relative to the spindle for the desired speed of the spindle during operation in the field.

The automatic means includes a pressure transducer 75, which would be connected, for example, in the embodiment of FIG. 1 to the passage 32 whereby the oil pressure between the inner surface of the bearing shoe 13 and the spindle 10 would be supplied to the pressure transducer 75. The pressure transducer 75 supplies an AC output voltage, which varies between 0 and 5 volts in accordance with the magnitude of the oil pressure transmitted thereto.

A DC motor 76, which comprises an armature 77 and a field winding 78, is connected to the adjusting bar 19 through reduction gearing (not shown) to move the adjusting bar 19. The adjusting bar 19 is positioned in accordance with the pressure of the oil supplied to the pressure transducer 75.

The armature 77 is connected to a positive DC voltage source, which is preferably 200 volts, and also is grounded. One end of the field winding 78 is connected to a positive DC voltage source, which is preferably 180 volts, through normally closed contacts 79–1 of a control relay 79, and the other end of the field winding 78 is connected through normally open contacts 79–2 of the control relay 79 to the same positive DC voltage source.

The winding 78 has its end, which is connected to the positive DC voltage source through the normally closed contacts 79–1 of the control relay 79, also connected to ground through normally open contacts 79–3 of the control relay 79. The field winding 78 has its end, which is connected to the positive DC voltage source through the normally open contacts 79–2, also connected through normally closed contacts 79–4 of the control relay 79 to ground.

Accordingly, when the control relay 79 is not energized, DC current flows from the positive DC voltage source to ground through the normally closed contacts 79–1, the field winding 78, and the normally closed contacts 79–4. This results in the motor 76 advancing the adjusting bar 19 in a direction to cause the bearing shoes 12–14 to be moved closer to the spindle 10. Thus, this direction of movement of the motor 76 occurs when the pressure of the oil drops below a predetermined or selected level.

When the relay 79 is picked up, the motor 76 is driven in the opposite direction because the normally open contacts 79–2 and 79–3 close while the normally closed contacts 79–1 and 79–4 open. This occurs when the oil pressure exceeds a predetermined or selected value. This causes the adjusting bar 19 to be moved by the motor 76 through the reduction gearing so that the bearing shoes 12–14 are moved away from the spindle 10.

One side of the control relay 79 is connected to a positive DC voltage source, which is preferably 12 volts, while its other side is connected to ground through an NPN transistor 80. Accordingly, whenever the transistor 80 is turned on, the control relay 79 is energized; the control relay 79 is deenergized when the transistor 80 is turned off.

The turning on and off of the transistor 80 is controlled from a flip-flop 81, which has its output connected through a resistor 82 to the base of the transistor 80. Thus, when the flip-flop 81 has a high or positive output, the transistor 80 is turned on to pick up the motor control relay 79. A low or ground output from the flip-flop 81 turns off the transistor 80 whereby the control relay 79 is deenergized. One suitable example of the flip-flop 81 is sold by Amelco Semiconductor as Model 312.

The output of the flip-flop 81 is controlled in accordance with the output signal from the pressure transducer 75. When the output signal from the pressure transducer 75 rises above a predetermined voltage level, the output of the flip-flop 81 is high so that the transistor 80 is turned on whereby the control relay 79 is picked up. This causes the motor 76 to rotate in a direction in which the adjusting bar 19 is moved so that the bearing shoes 12–14 are moved away from the spindle 10.

If the output signal from the pressure transducer 75 decreases below a predetermined level, the output of the flip-flop 81 drops to ground to turn off the transistor 80 whereby the relay 79 is deenergized. This results in the motor 76 being driven in the direction in which the bearing shoes 12–14 are moved closer to the spindle 10 by the adjusting bar 19 moving the bearing shoe 12.

The output signal of the pressure transducer 75 is fed through a full-wave rectifier 83 to convert the AC output signal of the pressure transducer 75 to DC. A capacitor 84 is employed to reduce the ripple.

The DC signal, which is equivalent to the AC output of the pressure transducer 75, is fed to a voltage comparator circuit 85. The signal on a lead 86 from the full-wave rectifier 84 is supplied as a current through a variable resistor 87 to the base of an NPN transistor 88 and through a diode 89 and a variable resistor 90 to the base of a PNP transistor 91.

The transistor 88 has its collector connected to a positive DC voltage source, which is preferably 12 volts, through a resistor 92 while its emitter is grounded. The transistor 91 has its emitter connected to a positive DC voltage source, which is preferably 12 volts, through a resistor 93 while its collector is grounded.

Between the resistor 90 and the transistor 91, a resistor 96 is connected to ground. This provides a path for the base current when the transistor 91 is turned off.

The transistor 88 also has its collector connected to input pins 97 and 98 of a NAND gate 99. The NAND gate 99 has its output pin 100 connected to input pins 101 and 102 of a NAND gate 103. The NAND gate 103 has its output pin 104 connected as one of two inputs to the flip-flop 81.

The PNP transistor 91 has its emitter connected to input means 105 and 106 of a NAND gate 107. The NAND gate 107 has its output pin 108 connected to input pins 109 and 110 of a NAND gate 111. The NAND gate 111 has its output pin 112 connected as the other of the two inputs to the flip-flop 81. One suitable example of each of the NAND gates 99, 103, 107, and 111 is sold by Amelco Semiconductors as Model 321.

Accordingly, when the output voltage from the pressure transducer 75 falls below a predetermined level, the transistor 91 is turned on. The magnitude of the variable resistor 90 is selected to determine the voltage at which it is desired to cause the bearing shoes 12–14 to be moved toward the spindle 10. Thus, by properly selecting the value of the variable resistor 90, the voltage, which produces the current that turns on the transistor 91, is determined.

When the transistor 91 is turned on due to the current resulting from the output of the pressure transducer 75 falling below the predetermined or selected voltage level, the voltage on the input pins 105 and 106 of the NAND gate 107 goes to ground. As a result, the NAND gate 107 changes state so that the voltage on the output pin 108 rises to 12 volts from ground. Since the output pin 108 is connected to both of the input pins 109 and 110 of the NAND gate 111, this results in a voltage of 12 volts being on the input pins 109 and 110. Thus, the NAND gate 111 changes state so that the voltage on the output pin 112 drops to ground from 12 volts.

As a result of the output pin 112 of the NAND gate 111 going to ground, the output of the flip-flop 81 goes to ground. When this occurs, the transistor 80 is turned off so that the control relay 79 is deenergized.

With the control relay 79 deenergized, DC current flows from the positive DC voltage source to ground through the normally closed contacts 79–1, the field winding 78, and the normally closed contacts 79–4. This direction of current flow through the field winding 78 causes rotation of the armature 77 of the motor 76 in a direction so that the bearing shoes 12–14 are moved closer to the spindle 10 to decrease the clearance therebetween. This causes the oil pressure in the passage 32 to increase to raise the output voltage of the pressure transducer 75.

Since the motor 76 continuously rotates, the clearance between the bearing shoes 12–14 and the spindle 10 is reduced so that the oil pressure in the passage 32 increases. This results in the output voltage of the pressure transducer 75 exceeding the predetermined lower voltage level at which the transistor 91 is turned on. As a result, the current to the base of the transistor 91 increases so that the transistor 91 turns off but the output of flip-flop 81 remains the same, i.e., at ground, until it receives an input from the output pin 104 of the NAND gate 103.

As the motor 76 continues to rotate, it eventually moves the bearing shoes 12–14 sufficiently close to the spindle 10 to increase the oil pressure in the passage 32 so that the output voltage of the pressure transducer 75 exceeds the upper predetermined or selected voltage level, which is set by the magnitude of the variable resistor 87. When the output voltage of the pressure transducer 75 exceeds the upper predetermined or selected voltage level, the transistor 88 turns on due to the magnitude of the current to its base.

When this occurs, the signal on the input pins 97 and 98 of the NAND gate 99 drops to ground from a positive voltage. This results in the NAND gate 99 changing state so that the output pin 100 of the NAND gate 99 becomes 12 volts.

Since the output pin 100 of the NAND gate 99 is connected to the input pins 101 and 102 of the NAND gate 103, the NAND gate 103 has both of its inputs at positive or high levels. As a result, the NAND gate 103 changes state, and the output pin 104 falls to ground.

Since the output pin 104 of the NAND gate 103 is the other input to the flip-flop 81, the flip-flop 81 changes state when it receives a grounded input from the output pin 104 of the NAND gate 103. This results in the output of the flip-flop 81 becoming positive (12 volts) to turn on the transistor 80. When the transistor 80 turns on, the control relay 79 is picked up.

As a result of the control relay 79 being energized, the normally open contacts 79–2 and 79–3 close while the normally closed contacts 79–1 and 79–4 open. This reverses the direction of rotation of the motor 76 to move the bearing shoes 12–14 away from the spindle 10 whereby the oil pressure in the passage 32 tends to decrease.

As the oil pressure decreases, the transistor 88 turns off because the voltage output from the transducer 75 is below the level required to provide sufficient current to keep the transistor 88 turned on. However, the motor 76 continues to rotate in the same direction to move the bearing shoes 12–14 away from the spindle 10 until the flip-flop 81 receives an input from the output pin 112 of the NAND gate 111. This occurs only when the oil pressure decreases below its desired minimum.

It should be understood that the relay 79 has a diode 113' in parallel to cut down the transients set up by the coil of the relay 79 when it is energized. These transients could cause the flip-flop 81 to change state.

It should be understood that the movement of the bearing shoes 12–14 toward and away from the spindle 10 is a very small increment of movement. The clearance between the shoes 12–14 and the spindle 10 varies from approximately 0.0001 inch at minimum speed to approximately 0.0005 inch at maximum speed (a ratio of five to one. Thus, when the pressure is in the range of 600–700 p.s.i., for example, a pressure change of 50 p.s.i. results in changing of the clearance at any given speed only one-twelfth (fifty six-hundredths). Therefore, a clearance change of 0.00004 inch at maximum speed causes a change of 50 p.s.i. while a change of 0.000008 inch at minimum speed causes a change of 50 p.s.i. Thus, the clearance of the bearing shoes 12–14 from the spindle 10 does not change significantly for the oil pressure to change substantially.

Accordingly, the control circuit of FIGS. 5 and 6 can be employed to insure that the bearing shoes 12–14 are properly disposed with respect to the spindle 10 for the desired speed of the spindle 10. If it should be desired to increase or decrease the speed of the spindle 10, then the magnitudes of the variable resistors 87 and 90 are changed accordingly.

While the circuit of FIGS. 5 and 6 has been described with respect to the embodiment of FIG. 1, it should be understood that it could be readily employed with the modifications of FIGS. 3 and 4. Of course, two of the circuits would be needed for the embodiment of FIG. 4.

One example of the various parameters of the circuit of FIGS. 5 and 6 follows:

TRANSISTORS

| | |
|---|---|
| 80 and 88 | 2N 3567 |
| 91 | 2N 4354 |

RESISTORS IN OHMS

| | |
|---|---|
| 82 | 5K |
| 87 | Variable to 10K |
| 90 | Variable to 5K |
| 92 and 93 | 10K |
| 96 | 1k |

CAPACITOR IN MICROFARADS

| | |
|---|---|
| 84 | 0.1 |

NAND GATES

| | |
|---|---|
| 99, 103, 107, and 111 | Model 321 of Amelco Semiconductor |

While the present invention has described the chamber 15 in the housing 11 as being filled with oil, it should be understood that oil could be supplied to the chamber from a reservoir by means of a pump in the well-known manner. Then, the oil would be returned to the reservoir. This pressurized oil would enter between each of the bearing shoes and the spindle to form an oil film therebetween.

It should be understood that the adjusting bar 40 is initially positioned so that the pivotal mounting portion 38 of the bearing shoe 35 is offset slightly from an equal angular relation to the pivotal mounting portions 41 and 42 of the bearing shoes 36 and 37, respectively, and closer to the portion 41 for the same reasons as discussed with respect to the adjusting bar 19. A similar arrangement exists for the adjusting bars 60 and 63 of the embodiment of FIG. 4.

An advantage of this invention is that the position of each of the bearing shoes for a spindle may be adjustably positioned in accordance with the speed at which the spindle is to be operated. Another advantage of this invention is that each of the bearing shoes for a spindle has maximum rigidity irrespective of the speed of the spindle.

For purposes of exemplification, particular embodiments of the invention have been shown and described according to the best present understanding thereof. However, it will be apparent that changes and modifications in the arrangement and construction of parts thereof may be resorted to without departing from the spirit and scope of the invention.

What is claimed is:

1. In a bearing arrangement having a housing, a member rotatably mounted in said housing, a plurality of bearing shoes carried by said housing and circumferentially spaced around the rotating member, means to pivotally mount each of the bearing shoes in the housing, and each of the bearing shoes creating an oil film between it and the rotating member during rotation of the rotating member, the improvement comprising:
    means to move at least one of the pivotal mounting means of the bearing shoes tangentially to a locus of rotation about the axis of the rotating member to adjustably change the position of each of the moved pivotal mounting means of the bearing shoes relative to the rotating member in accordance with a selected speed of the rotating member to change the clearance between each of the bearing shoes and the rotating member.

2. The improvement according to claim 1 in which:
    the plurality of bearing shoes comprises three bearing shoes circumferentially spaced from each other;
    and said adjustable means includes means moving only one of the pivotal mounting means to change the position of the pivotal mounting means of the one of the three bearing shoes to change the clearance between each of the bearing shoes and the rotating member.

3. The improvement according to claim 1 in which:
    the plurality of bearing shoes comprises four bearing shoes circumferentially spaced from each other;
    and said adjustable means includes separate means moving the pivotal mounting means of two adjacent bearing shoes of the four bearing shoes to change the positions of the moved pivotal mounting means of the two adjacent bearing shoes of the four bearing shoes to change the clearance between each of the bearing shoes and the rotating member.

4. The improvement according to claim 1 including:
    means to ascertain the oil pressure between at least one of the bearing shoes that is not moved by said adjustable means and the rotating member;
    and said adjustable means positioning the moved pivotal mounting means of at least one of the other of the bearing shoes in accordance with the ascertained oil pressure.

5. The improvement according to claim 2 including:
    means to ascertain the oil pressure between one of the bearing shoes that is not moved by said adjustable means and the rotating member;
    and said adjustable means positions the moved pivotal mounting means of one of the other of the bearing shoes in accordance with the ascertained oil pressure.

6. The improvement according to claim 3 including:
    two separate means to ascertain the oil pressure between each of two adjacent bearing shoes and the rotating member;
    and said adjustable means includes:
        means moving the pivotal mounting means of one of the other two bearing shoes to position the moved pivotal mounting means of the one of the other two bearing shoes in accordance with the ascertained oil pressure between the diametrically disposed bearing shoe and the rotating member;

and means moving the pivotal mounting means of the other of the other two bearing shoes to position the moved pivotal mounting means of the other of the other two bearing shoes in accordance with with the ascertained oil pressure between the diametrically disposed bearing shoe and the rotating member.

7. In a bearing arrangement having a housing, a member rotatably mounted in the housing, a plurality of bearing shoes carried by the housing and circumferentially spaced around the rotating member, means to pivotally mount each of the bearing shoes in the housing, and each of the bearing shoes creating an oil film between it and the rotating member during rotation of the rotating member, the improvement comprising:

means to ascertain the oil pressure between at least one of the bearing shoes and the rotating member but less than all of the bearing shoes;

and means to engage at least one of the pivotal mounting means of one of the other bearing shoes to adjustably change the position of at least the one of the other of the bearing shoes relative to the rotating member in accordance with the ascertained oil pressure to change the clearance between each of the bearing shoes and the rotating member.

8. The improvement according to claim 7 in which:
the plurality of bearing shoes comprises three bearing shoes circumferentially spaced from each other;
said ascertaining means ascertains the pressure between only one of the bearing shoes and the rotating member;
and said adjustable means positions only one of the other of the bearing shoes relative to the rotating member in accordance with the ascertained oil pressure.

9. The improvement according to claim 7 in which:
the plurality of bearing shoes comprises four bearing shoes circumferentially spaced from each other;
said ascertaining means includes separate means to ascertain the oil pressure between each of two adjacent of the bearing shoes and the rotating member;
and said adjustable means includes:
means to position one of the other two bearing shoes relative to the rotating member in accordance with the ascertained oil pressure between the diametrically disposed bearing shoe and the rotating member;
and means to position the other of the other two bearing shoes relative to the rotating member in accordance with the ascertained oil pressure between the diametrically disposed bearing shoe and the rotating member.

10. A method of adjusting the clearance between each of a plurality of circumferentially spaced bearing shoes and a rotating member with an oil film between each of the bearing shoes and the rotating member during rotation of the rotating member, the method comprising:

ascertaining the oil pressure between at least one of the bearing shoes and the rotating member but less than all of the bearing shoes;

and adjusting the position of at least one other of the bearing shoes relative to the rotating member in accordance with the oil pressure to change the clearance between each of the bearing shoes and the rotating member until the ascertained oil pressure is at a selected value.

11. The method according to claim 10 in which the position of at least one of the bearing shoes relative to the rotating member is adjusted by adjusting the position of the pivotal mounting for the bearing shoe by moving the pivotal mounting tangentially to a locus of rotation about the axis of the rotating member.

12. The method according to claim 10 in which:
the plurality of bearing shoes comprises three circumferentially spaced bearing shoes;
only the oil pressure between one of the bearing shoes and the rotating member is ascertained;
and only one of the other of the bearing shoes has its position adjusted.

13. The method according to claim 12 in which the position of one of the other bearing shoes relative to the rotating member is adjusted by adjusting the position of the pivotal mounting for the one of the other bearing shoes by moving the pivotal mounting tangentially to a locus of rotation about the axis of the rotating member.

14. The method according to claim 10 in which:
the plurality of bearing shoes comprises four circumferentially spaced bearing shoes;
the oil pressure between each of two adjacent bearing shoes and the rotating member are separately ascertained;
the position of one of the other two of the bearing shoes relative to the rotating member is first adjusted in accordance with the ascertained oil pressure between the diametrically disposed bearing shoe and the rotating member;
and the position of the other of the other two of the bearing shoes relative to the rotating member is then adjusted in accordance with the ascertained oil pressure between the diametrically disposed bearing shoe and the rotating member.

15. The method according to claim 14 in which the position of each of the other two bearing shoes relative to the rotating member is adjusted by adjusting the position of the pivotal mounting for each of the other two bearing shoes by moving each of the pivotal mountings of the other two bearing shoes tangentially to a locus of rotation about the axis of the rotating member.

16. A method of adjusting the clearance between each of a plurality of circumferentially spaced pivotally mounted bearing shoes and a rotating member, said method including:

movably supporting the pivotal mounting of at least one of the bearing shoes;

and changing the position of the movably supported pivotal mounting relative to the rotating member by moving the movably supported pivotal mounting tangentially to a locus of rotation about the axis of the rotating member in accordance with a selected speed of the rotating member to change the clearance between each of the bearing shoes and the rotating member.

17. The method according to claim 16 in which:
the plurality of bearing shoes comprises three bearing shoes circumferentially spaced from each other;
the pivotal mounting of one of the bearing shoes is movably supported;
and the position of only the movably supported pivotal mounting is changed.

18. The method according to claim 16 in which:
the plurality of bearing shoes comprises four bearing shoes circumferentially spaced from each other;
the pivotal mounting of each of two adjacent bearing shoes of the four bearing shoes is separately movably supported;
and the position of the movably supported pivotal mountings are changed by moving each of the movably supported pivoted mountings tangentially to a locus of rotation about the axis of the rotating member.

19. The improvement according to claim 1 in which:
said adjustable means includes movable means supported by the housing;
the number of said movable means is equal to the number of pivotal mounting means movable by said adjustable means;
and said movable means includes means to support one of the moved pivotal mounting means.

20. The improvement according to claim 2 in which:
said adjustable means includes movable means supported by the housing;
and said movable means includes means to support the moved pivotal mounting means of the bearing shoe.

21. The improvement according to claim 3 in which:
said adjustable means includes two separate movable means supported by the housing;

and each of said movable means includes means to support one of the moved pivotal mounting means of the bearing shoes.

22. The improvement according to claim 4 in which:
said adjustable means includes movable means supported by the housing;
the number of said movable means being equal to the number of pivotal mounting means movable by said adjustable means;
and said movable means includes means to support one of the moved pivotal mounting means.

23. The improvement according to claim 5 in which:
said adjustable means includes movable means supported by the housing;
and said movable means includes means to support the moved pivotal mounting means of the bearing shoe.

24. The improvement according to claim 6 in which:
said adjustable means includes two separate movable means supported by the housing;
and each of said movable means includes means to support one of the moved pivotal mounting means of the bearing shoes.